(12) United States Patent
Lai et al.

(10) Patent No.: US 10,849,007 B2
(45) Date of Patent: Nov. 24, 2020

(54) METHOD FOR CONTROLLING VOLTE FUNCTION BASED ON MOBILE TERMINAL, AND MOBILE TERMINAL

(71) Applicant: JRD Communication (Shenzhen) LTD., Shenzhen (CN)

(72) Inventors: Yanming Lai, Shenzhen (CN); Qicai Gu, Shenzhen (CN); Yanshan Lin, Shenzhen (CN); Caijin Zhong, Shenzhen (CN); Lu Jiao, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 0 days.

(21) Appl. No.: 16/488,598

(22) PCT Filed: Feb. 8, 2018

(86) PCT No.: PCT/CN2018/075786
§ 371 (c)(1),
(2) Date: Aug. 26, 2019

(87) PCT Pub. No.: WO2018/153272
PCT Pub. Date: Aug. 30, 2018

(65) Prior Publication Data
US 2020/0187037 A1 Jun. 11, 2020

(30) Foreign Application Priority Data
Feb. 27, 2017 (CN) .......................... 2017 1 0108366

(51) Int. Cl.
*H04W 76/27* (2018.01)
*H04W 28/02* (2009.01)
(Continued)

(52) U.S. Cl.
CPC ... *H04W 28/0221* (2013.01); *H04M 1/72577* (2013.01); *H04W 52/0245* (2013.01)

(58) Field of Classification Search
CPC . H04W 28/00; H04W 36/0022; H04W 36/22; H04W 36/0083; H04W 36/30;
(Continued)

(56) References Cited

U.S. PATENT DOCUMENTS 9,277,472 B1 3/2016 Price et al.
10,069,961 B2 9/2018 Han
(Continued)

FOREIGN PATENT DOCUMENTS

CN 104378786 2/2015
CN 104378808 2/2015
(Continued)

OTHER PUBLICATIONS

International Search Report and the Written Opinion dated Apr. 10, 2018 From the International Searching Authority Re. Application No. PCT/CN2018/075786 and Its Translation of Search Report Into English. (9 Pages).

*Primary Examiner* — Jean A Gelin

(57) ABSTRACT

Disclosed in the present invention are a method for controlling a VOLTE function based on a mobile terminal, and the mobile terminal. The method comprises: detecting a working state of a VOLTE function; if the VOLTE function is in a disabled state, further obtaining a signal strength of an LTE network where a mobile terminal is located; if the signal strength is greater than or equal to a first strength threshold, continuing to obtain a data traffic of the mobile terminal within a first preset time interval; and if the data traffic is smaller than a first preset traffic value, enabling the VOLTE function. In the way, in the present invention, a VOLTE function can be automatically enabled according to a current (Continued)

use state of a mobile terminal, thereby bringing use convenience to a user.

11 Claims, 2 Drawing Sheets

(51) Int. Cl.
*H04M 1/725* (2006.01)
*H04W 52/02* (2009.01)

(58) Field of Classification Search
CPC ..... H04W 88/06; H04W 48/18; H04W 48/12; H04W 52/243; H04W 52/244; H04W 76/10; H04W 76/12; H04W 76/27; H04W 76/18; H04W 24/02; H04W 24/04; H04M 7/006; H04M 7/0057; H04M 1/72522; H04M 1/72577; H04M 7/0024
See application file for complete search history.

(56) References Cited

U.S. PATENT DOCUMENTS

| | | | |
|---|---|---|---|
| 2014/0106769 A1* | 4/2014 | Bai | H04W 52/244 455/452.1 |
| 2014/0219272 A1* | 8/2014 | Shuman | H04L 65/1016 370/352 |
| 2015/0181416 A1* | 6/2015 | Dominguez Romero | H04W 8/22 370/328 |
| 2015/0195751 A1* | 7/2015 | Aoyagi | H04W 36/0022 370/230 |
| 2016/0095151 A1* | 3/2016 | Chuttani | H04L 65/40 370/329 |
| 2016/0119823 A1* | 4/2016 | Ko | H04W 36/0022 370/252 |
| 2016/0119858 A1* | 4/2016 | Liu | H04W 36/0083 455/434 |
| 2016/0149966 A1* | 5/2016 | Remash | H04L 65/1096 370/351 |
| 2016/0344572 A1* | 11/2016 | Brust | H04L 12/66 |
| 2016/0353330 A1* | 12/2016 | Naik | H04W 36/0022 |
| 2017/0013644 A1* | 1/2017 | Zhu | H04W 48/12 |
| 2017/0094565 A1* | 3/2017 | Sharma | H04W 76/18 |
| 2017/0230844 A1* | 8/2017 | Li | H04L 43/16 |
| 2018/0146386 A1* | 5/2018 | Jia | H04L 43/04 |
| 2019/0014519 A1* | 1/2019 | Brown | H04W 76/16 |
| 2019/0069328 A1* | 2/2019 | Sharma | H04L 43/16 |

FOREIGN PATENT DOCUMENTS

| | | |
|---|---|---|
| CN | 104427524 | 3/2015 |
| CN | 105323362 | 2/2016 |
| CN | 105491644 | 4/2016 |
| CN | 106376045 | 2/2017 |
| CN | 107046598 | 8/2017 |
| WO | WO 2018/153272 | 8/2018 |

* cited by examiner

METHOD FOR CONTROLLING VOLTE FUNCTION BASED ON MOBILE TERMINAL, AND MOBILE TERMINAL

RELATED APPLICATIONS

This application is a National Phase of PCT Patent Application No. PCT/CN2018/075786 having International filing date of Feb. 8, 2018, which claims the benefit of priority of Chinese Patent Application No. 201710108366.4 filed on Feb. 27, 2017. The contents of the above applications are all incorporated by reference as if fully set forth herein in their entirety.

FIELD AND BACKGROUND OF THE INVENTION

The present disclosure relates to the field of mobile terminal, more particularly, to a method for controlling a voice over LTE (VOLTE) function based on a mobile terminal and a mobile terminal.

With the continuous development of mobile terminal technology, people use mobile terminals with increasing frequency to talk, access the Internet, etc. Hence, demands on the call drop rate and data rate of mobile terminals are increasingly higher, and VOLTE can satisfy people's demands. The advantages of VOLTE are as follows. It takes only 2 seconds to connect the phone. In addition, the quality of connection is increased by 40% when compared with the 2/3G network because VOLTE uses the high-resolution codec technology, and the call drop rate is close to zero. Even more, the high-speed data services can be used while talking on the phone, thus providing users with a very good experience.

In practical applications, since the VOLTE function of the mobile terminal may be manually disabled by the user unintentionally, the mobile terminal cannot use the VOLTE function under the circumstances that the network supports the VOLTE function. As a result, the user experience is deteriorated.

SUMMARY OF THE INVENTION

The technical problem resolved by the present disclosure is to provide a method for controlling a VOLTE function based on a mobile terminal and a mobile terminal, which can automatically enable the VOLTE function according to the current usage state of the mobile terminal, thus facilitating the user's operation.

The present disclosure provides a mobile terminal. The mobile terminal comprises a processor and a memory coupled to the processor. The memory is configured to store a program instruction. The processor comprises: a VOLTE function detection module disposed in the mobile terminal and configured to detect a working state of the VOLTE function; a first acquisition module disposed in the mobile terminal and connected to the VOLTE function detection module, the first acquisition module being configured to acquire a signal strength of an LTE network where the mobile terminal is located when the VOLTE function detection module detects that the VOLTE function is in a disabled state; a second acquisition module disposed in the mobile terminal and connected to the first acquisition module, the second acquisition module being configured to acquire data traffic of the mobile terminal within a first predetermined time interval when the signal strength acquired by the first acquisition module is greater than or equal to a first strength threshold; and a control module disposed in the mobile terminal and connected to the second acquisition module, the control module being configured to enable the VOLTE function when the data traffic acquired by the second acquisition module is smaller than a first predetermined traffic value. The processor further comprises: a signal strength acquisition module disposed in the mobile terminal and connected to the VOLTE function detection module, the signal strength acquisition module being configured to acquire the signal strength of the LTE network where the mobile terminal is located every first predetermined period when the VOLTE function detection module detects that the VOLTE function is in an enabled state; and a battery mode acquisition module disposed in the mobile terminal and connected to the VOLTE function detection module, the battery mode acquisition module being configured to acquire an operating mode of a battery of the mobile terminal every second predetermined period when the VOLTE function detection module detects that the VOLTE function is in the enabled state. When the signal strength acquired by the signal strength acquisition module is smaller than a second strength threshold or when the operating mode of the battery acquired by the battery mode acquisition module is a power saving mode, the control module disable the VOLTE function.

The present disclosure further provides a method for controlling a VOLTE function based on a mobile terminal. The method comprises: detecting a working state of the VOLTE function; further acquiring a signal strength of an LTE network where the mobile terminal is located if the VOLTE function is in a disabled state; continuing to acquire data traffic of the mobile terminal within a first predetermined time interval if the signal strength is greater than or equal to a first strength threshold; and enabling the VOLTE function if the data traffic is smaller than a first predetermined traffic value.

The present disclosure still provides a mobile terminal comprising a processor and a memory coupled to the processor. The memory is configured to store a program instruction. The processor is configured to execute the program instruction to perform operations of: detecting a working state of the VOLTE function; acquiring a signal strength of an LTE network where the mobile terminal is located if the VOLTE function is in a disabled state; continuing to acquire data traffic of the mobile terminal within a first predetermined time interval if the signal strength is greater than or equal to a first strength threshold; and enabling the VOLTE function if the data traffic is smaller than a first predetermined traffic value.

The beneficial effects of the present disclosure are as follows. The method for controlling the VOLTE function based on the mobile terminal and the mobile terminal according to the present disclosure detects the working state of the VOLTE function. If the VOLTE function is in the disabled state, the signal strength of the LTE network where the mobile terminal is located is further acquired. If the signal strength is greater than or equal to the first strength threshold, data traffic of the mobile terminal within the first predetermined time interval is continued to be acquired. If the data traffic is smaller than the first predetermined traffic value, the VOLTE function is enabled. Through the above method, the VOTLE function can be automatically enabled according to the current usage state of the mobile terminal in the present disclosure, thus improving the user experience.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Certain terms are used throughout the description and following claims to refer to particular components. As one skilled in the art will appreciate, manufacturers may refer to a component by different names. This document does not intend to distinguish between components that differ in name but not function. The present disclosure will be described in detail below with reference to the accompanying drawings and embodiments.

Figure 1:
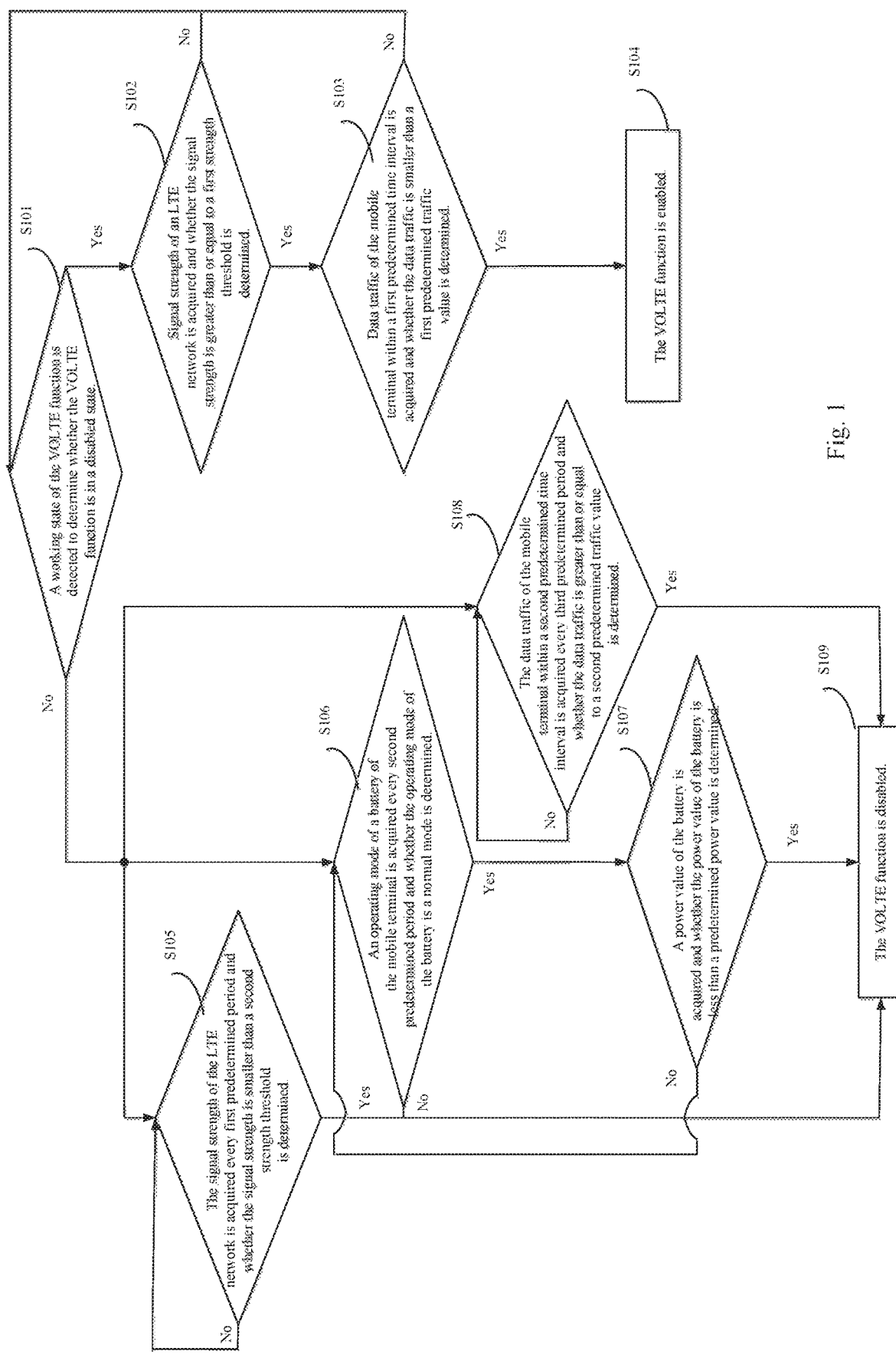
FIG. 1 is a flowchart of a method for controlling a VOLTE function based on a mobile terminal according to one embodiment of the present disclosure.

FIG. 1 is a flowchart of a method for controlling a VOLTE function based on a mobile terminal according to one embodiment of the present disclosure. If substantially the same result is obtained, the method of the present disclosure is not limited to the flow sequence shown in FIG. 1. The method comprises the following steps:

Step S101: A working state of the VOLTE function is detected to determine whether the VOLTE function is in a disabled state. If the VOLTE function is in the disabled state, step S102 is executed. If the VOLTE function is in an enabled state, step S105, S106 or step S108 is executed.

In step S101, the mobile terminal automatically detects the working state of the VOLTE function after being powered on. The working state of the VOLTE function comprises the enabled state and the disabled state. When the VOLTE function is in the enabled state, not only can the mobile terminal realize high-speed data services under the 4G network, but it can also realize high-quality audio and video calls, that is, the unification of data and voice services on a same network. When the VOLTE function is in the disabled state, the mobile terminal normally uses the 2/3/4G network for voice or data services.

In the present embodiment, an initial working state of the VOLTE function is the disabled state when the mobile terminal is powered on.

In the present embodiment, if the VOLTE function is detected to be in the enabled state in step S101, the process proceeds to step S105, S106 or step S108. Step S105, step S106 and step S108 are three different threads in a same process, and the three threads simultaneously work through disposing three different timers. In other words, when the VOLTE function is in the enabled state, if one of the three timers in step S105, step S106, and step S108 reaches a predetermined timing period corresponding to it, the step corresponding to this timer is executed.

Step S102: Signal strength of an LTE network where the mobile terminal is located is acquired and whether the signal strength is greater than or equal to a first strength threshold is determined. If the signal strength is greater than or equal to the first strength threshold, step S103 is executed. Otherwise, step S101 is continued.

In step S102, when the VOLTE function is detected to be in the disabled state in step S101, the mobile terminal acquires the signal strength of the LTE network and determines whether the signal strength is greater than or equal to the first strength threshold. The first strength threshold may be set depending on actual usage of the mobile terminal.

Step S103: Data traffic of the mobile terminal within a first predetermined time interval is acquired and whether the data traffic is smaller than a first predetermined traffic value is determined. If the data traffic is smaller than the first predetermined traffic value, step S104 is executed. Otherwise, step S101 is continued.

In step S103, in the present embodiment, the data traffic within the first predetermined time interval may be data traffic used in a current month. In practical applications, the data and voice services of the mobile terminal are generally billed by monthly invoice. When the data traffic used in the current month is greater than or equal to the first predetermined traffic value, the data traffic consumption is too much. Under the circumstances, in order to avoid excessive traffic fees, the mobile terminal keeps the VOLTE function in the disabled state. Those skilled in the art would understand that if a user still insists on using the VOLTE function, the VOLTE function can be enabled manually.

In some other embodiments, the data traffic within the first predetermined time interval may be data traffic every few days, every few hours, or every few minutes, and which may be set depending on actual usage of the mobile terminal.

Step S104: The VOLTE function is enabled.

In step S104, when the signal strength of the LTE network where the mobile terminal is located is greater than or equal to the first strength threshold and the data traffic of the mobile terminal within the first predetermined time interval is smaller than the first predetermined traffic value, the VOLTE function is automatically enabled to enable the working state of the VOLTE function, thus providing the user with high-quality voice service(s) and high-speed Internet access.

In addition, after step S104 is executed, the process jumps to step S101 to execute the flow in a loop.

Step S105: The signal strength of the LTE network where the mobile terminal is located is acquired every first predetermined period and whether the signal strength is smaller than a second strength threshold is determined. If the signal strength is smaller than the second strength threshold, step S109 is executed. Otherwise, step S105 is continued.

In step S105, the second strength threshold is preferably smaller than the first strength threshold in the present embodiment. In other words, as for the signal strength, the threshold for enabling the VOLTE function is higher than the threshold for using the VOLTE function. In other embodiments, the second strength threshold may be equal to the first strength threshold.

When the signal strength of the LTE network is greater than or equal to the second strength threshold, the working state of the VOLTE function is kept in the enabled state.

Step S106: An operating mode of a battery of the mobile terminal is acquired every second predetermined period and whether the operating mode of the battery is a normal mode is determined. If the operating mode of the battery is the normal mode, the process proceeds to step S107. Otherwise, step S109 is executed.

In step S106, the operating mode of the battery comprises the normal mode and a power saving mode. When the operating mode of the battery is not the normal mode, that is, the power saving mode, step S109 is executed.

Step S107: A power value of the battery is acquired and whether the power value of the battery is less than a predetermined power value is determined. If the power value of the battery is less than the predetermined power value, the process proceeds to step S109. Otherwise, step S106 is continued.

In step S107, when the operating mode of the battery is the normal mode and the power value of the battery is more than or equal to the predetermined power value, the working state of the VOLTE function is kept in the enabled state.

Step S108: The data traffic of the mobile terminal within a second predetermined time interval is acquired every third predetermined period and whether the data traffic is greater than or equal to a second predetermined traffic value is determined. If the data traffic is greater than or equal to the second predetermined traffic value, step S109 is executed. Otherwise, step S108 is continued.

In step S108, when the data traffic of the mobile terminal within the second predetermined time interval is smaller than the second predetermined traffic value, the working state of the VOLTE function is kept in the enabled state.

According to the present embodiment, the first predetermined time interval and the first predetermined traffic value in step S103 are different from the second predetermined time interval and the second predetermined traffic value in step S108. In other embodiments, the first predetermined time interval and the first predetermined traffic value in step S103 may be the same as the second predetermined time interval and the second predetermined traffic value in step S108.

Step S109: The VOLTE function is disabled.

In step S109, when it is determined in step S105 that the signal strength of the LTE network where the mobile terminal is located is smaller than the second strength threshold, or when it is determined in step S106 that the operating mode of the battery of the mobile terminal is the power saving mode, or when it is determined in step S107 that the operating mode of the battery of the mobile terminal is the normal mode and the power value of the battery is less than the predetermined power value, or when it is determined in step S108 that the data traffic of the mobile terminal within the second predetermined time interval is greater than the second predetermined traffic value, the mobile terminal disables the VOLTE function.

Disabling the VOLTE function when the signal strength of the LTE network where the mobile terminal is located is smaller than the second strength threshold can resolve the following problem. The problem is that the mobile terminal still enables the VOLTE function when the signal of the current LTE network that supports the VOLTE function is too weak, which in turn affects the user experience.

The VOLTE function is disabled when the operating mode of the battery of the mobile terminal is the power saving mode or when the operating mode of the battery of the mobile terminal is the normal mode and the power value of the battery is less than the predetermined power value. As a result, the power of the mobile terminal can be saved, and the lasting time of the mobile terminal can be extended.

The VOLTE function is disabled when the data traffic of the mobile terminal within predetermined time intervals is greater than predetermined traffic values. As a result, rapid consumption of data traffic can be avoided.

In addition, after step S109 is executed, the process jumps to step S101 to execute the flow in a loop.

Figure 2:
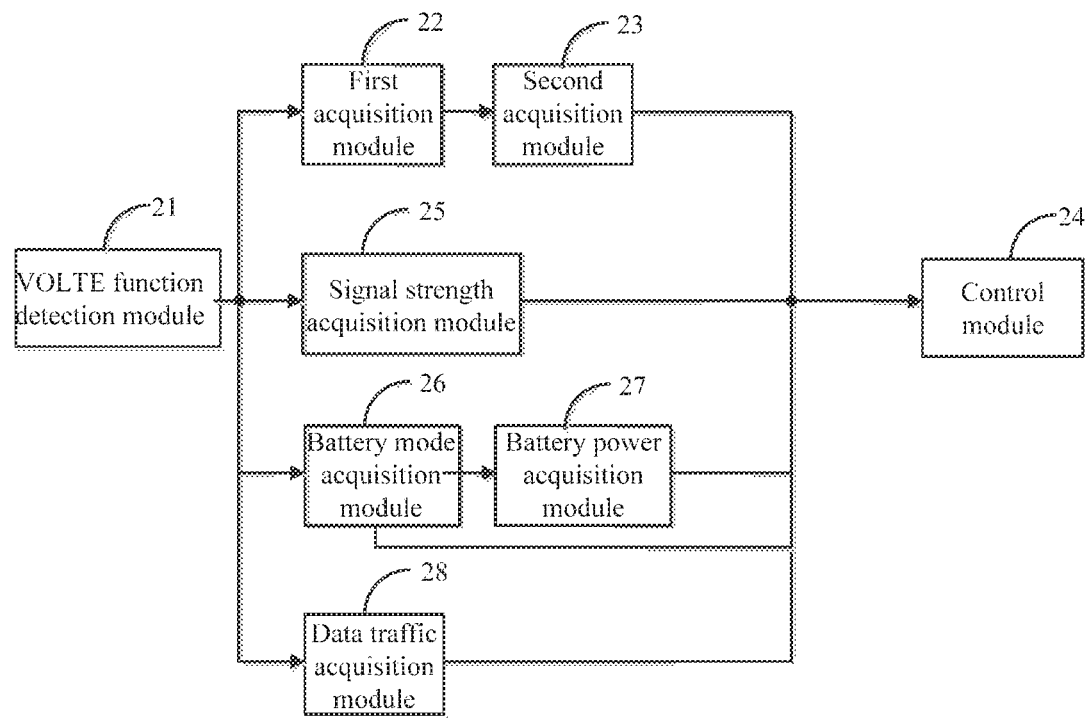
FIG. 2 is a schematic structural diagram of a mobile terminal according to one embodiment of the present disclosure.

FIG. 2 is a structural schematic diagram of a mobile terminal according to one embodiment of the present disclosure. The mobile terminal comprises a VOLTE function detection module 21, a first acquisition module 22, a second acquisition module 23, a control module 24, a signal strength acquisition module 25, a battery mode acquisition module 26, a battery power acquisition module 27, and a data traffic acquisition module 28.

The VOLTE function detection module 21 is disposed in the mobile terminal and is configured to detect a working state of the VOLTE function.

The first acquisition module 22 is disposed in the mobile terminal and is connected to the VOLTE function detection module 21. The first acquisition module 22 is configured to acquire a signal strength of an LTE network where the mobile terminal is located when the VOLTE function detection module 21 detects that the VOLTE function is in a disabled state.

The second acquisition module 23 is disposed in the mobile terminal and is connected to the first acquisition module 22. The second acquisition module 23 is configured to acquire data traffic of the mobile terminal within a first predetermined time interval when the signal strength acquired by the first acquisition module 22 is greater than or equal to a first strength threshold.

The control module 24 is disposed in the mobile terminal and is connected to the second acquisition module 23. The control module 24 is configured to enable the VOLTE function when the data traffic acquired by the second acquisition module 23 is smaller than a first predetermined traffic value.

The signal strength acquisition module 25 is disposed in the mobile terminal and is connected to the VOLTE function detection module 21 and the control module 24. The signal strength acquisition module 25 is configured to acquire the signal strength of the LTE network where the mobile terminal is located every first predetermined period when the VOLTE function detection module 21 detects that the VOLTE function is in an enabled state. The control module 24 disables the VOLTE function when the signal strength acquired by the signal strength acquisition module 25 is smaller than a second strength threshold.

The battery mode acquisition module 26 is disposed in the mobile terminal and is connected to the VOLTE function detection module 21 and the control module 24. The battery mode acquisition module 26 is configured to acquire an operating mode of a battery of the mobile terminal every second predetermined period when the VOLTE function detection module 21 detects that the VOLTE function is in the enabled state. The control module 24 disables the VOLTE function when the operating mode of the battery acquired by the battery mode acquisition module 26 is a power saving mode.

The battery power acquisition module 27 is disposed in the mobile terminal and is connected to the battery mode acquisition module 26 and the control module 24. The battery power acquisition module 27 is configured to acquire a power value of the battery when the operating mode of the battery acquired by the battery mode acquisition module 26 is a normal mode. The control module 24 disables the VOLTE function when the power value of the battery acquired by the battery power acquisition module 27 is less than a predetermined power value.

The data traffic acquisition module 28 is disposed in the mobile terminal and is connected to the VOLTE function detection module 21 and the control module 24. The data traffic acquisition module 28 is configured to acquire the data traffic of the mobile terminal within a second predetermined time interval every third predetermined period when the VOLTE function detection module 21 detects that the VOLTE function is in the enabled state. The control module 24 disables the VOLTE function when the data traffic acquired by the data traffic acquisition module 28 is greater than or equal to a second predetermined traffic value.

Figure 3:
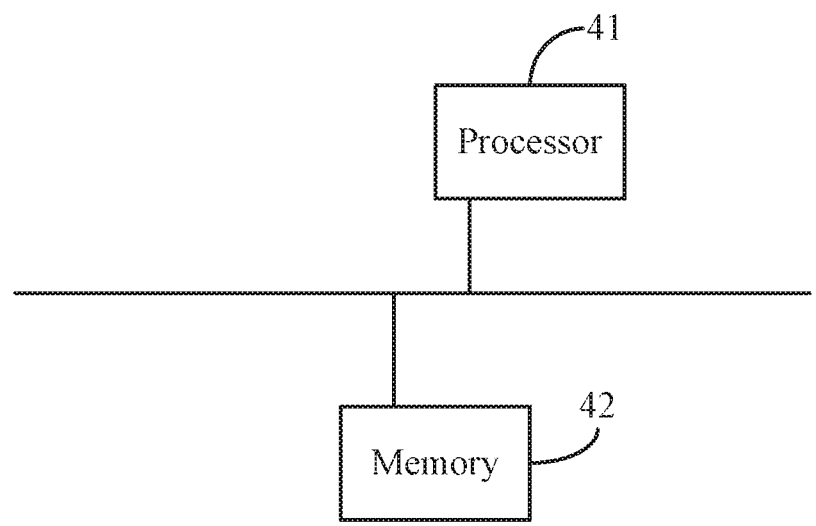
FIG. 3 is a schematic structural diagram of a physical device of a mobile terminal according to one embodiment of the present disclosure.

FIG. 3 is a schematic structural diagram of a physical device of a mobile terminal according to one embodiment of the present disclosure. The device according to the present embodiment may execute the steps of the above method. Since related description may be referred to the detailed description of the above method, a detailed description in this regard is not provided.

The device comprises a processor 41 and a memory 42 coupled to the processor 41.

The memory 42 is configured to store a program instruction.

The processor 41 is configured to execute the program instruction to detect a working state of the VOLTE function; further acquire a signal strength of an LTE network where the mobile terminal is located if the VOLTE function is in a disabled state; continue to acquire data traffic of the mobile terminal within a first predetermined time interval if the signal strength is greater than or equal to a first strength threshold; enable the VOLTE function if the data traffic is smaller than a first predetermined traffic value.

The processor 41 is further configured to execute the program instruction to acquire the signal strength of the LTE network where the mobile terminal is located every first predetermined period if the VOLTE function is in an enabled state; disable the VOLTE function if the signal strength is smaller than a second strength threshold.

The processor 41 is further configured to execute the program instruction to acquire an operating mode of a battery of the mobile terminal every second predetermined period if the VOLTE function is in the enabled state; disable the VOLTE function if the operating mode of the battery is a power saving mode.

The processor 41 is further configured to execute the program instruction to acquire a power value of the battery if the operating mode of the battery is a normal mode; disable the VOLTE function if the power value of the battery is less than a predetermined power value.

The processor 41 is further configured to execute the program instruction to acquire data traffic of the mobile terminal within a second predetermined time interval every third predetermined period if the VOLTE function is in the enabled state; disable the VOLTE function if the data traffic is greater than or equal to a second predetermined traffic value.

The beneficial effects of the present disclosure are as follows. The method for controlling the VOLTE function based on the mobile terminal and the mobile terminal according to the present disclosure detects the working state of the VOLTE function. If the VOLTE function is in the disabled state, the VOLTE function is automatically enabled when the signal strength of the LTE network where the mobile terminal is located is greater than or equal to the first strength threshold and the data traffic within the first predetermined time interval is smaller than the first predetermined traffic value, thus providing the user with high-quality voice service(s) and high-speed Internet access. If the VOLTE function is in the enabled state, the VOLTE function is disabled when the signal strength of the LTE network where the mobile terminal is located is smaller than the second strength threshold to resolve the following problem. The problem is that the mobile terminal still enables the VOLTE function when the signal of the current LTE network that supports the VOLTE function is too weak, which in turn affects the user experience. In addition, the VOLTE function is disabled when the operating mode of the battery of the mobile terminal is the power saving mode, or when the operating mode of the battery of the mobile terminal is the normal mode and the power value of the battery is less than the predetermined power value. As a result, the power of the mobile terminal can be saved, and the lasting time of the mobile terminal can be extended. Additionally, when the data traffic of the mobile terminal within the predetermined time intervals is greater than the predetermined traffic values, the VOLTE function is disabled, thus avoiding rapid consumption of data traffic.

In the several embodiments provided by the application, it should be understood that the revealed system, device and method may be implemented in other ways. For example, the abovementioned embodiments of the device are merely schematic. For example, the division of the circuits is merely a division based on logical functions; it may be different when they are put into practice. For example, a plurality of circuits or components may be combined or integrated into another system, or some features may be ignored or not be performed. And another point is that the displayed or discussed coupling, direct coupling or communication can be done through some interfaces, devices, or indirect coupling or communication between circuits; they may be electrical, mechanical, or in other forms.

The circuits described as separated parts may or may not be physically separated. A part that appeared as a circuit may or may not be a physical circuit, i.e. it can locate in one place, or it can be distributed to multiple network circuits. Part of or all of the circuits can be selected based on actual needs to achieve the object of the solutions of the present embodiments.

Furthermore, each of the functional circuits in the embodiments of the present disclosure may be integrated in one processing circuit, or may be independent circuits physically separated, or may integrate with another one or more circuits and appear as a single circuit.

If the function is realized as a software functional unit and used or sold as a standalone product, it may be stored in a computer-readable storage medium. Based on such understanding, the technical solutions of the present disclosure per se, or its contribution to the related art, or the technical solution may be realized in a software product. The computer software product is stored in a storage medium, including several commands that enable a computer device (may be a personal computer, a server, or network device) to perform all or part of the steps of the methods of the various embodiments of the present disclosure. The storage medium includes U-disk, removable hard disk, read-only memory (ROM), random access memory (RAM), magnetic disk or compact disc (CD) and other medium that can store program codes.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A mobile terminal comprising:
a processor; and
a memory coupled to the processor, configured to store a program instruction executable by the processor;
the program instruction comprising:
a VOLTE function detection module, disposed in the mobile terminal and configured to cause the processor to detect a working state of the VOLTE function;
a first acquisition module disposed in the mobile terminal and connected to the VOLTE function detection module, the first acquisition module being configured to cause the processor to acquire a signal strength of an LTE network where the mobile terminal is located when the VOLTE function detection module detects that the VOLTE function is in a disabled state;
a second acquisition module disposed in the mobile terminal and connected to the first acquisition module, the second acquisition module being configured to cause the processor to acquire data traffic of the mobile terminal within a first predetermined time interval when the signal strength acquired by the first acquisition module is greater than or equal to a first strength threshold; and
a control module disposed in the mobile terminal and connected to the second acquisition module, the control module being configured to cause the processor to enable the VOLTE function when the data traffic acquired by the second acquisition module is smaller than a first predetermined traffic value;
a signal strength acquisition module disposed in the mobile terminal and connected to the VOLTE function detection module, the signal strength acquisition module being configured to cause the processor to acquire the signal strength of the LTE network where the mobile terminal is located every first predetermined period when the VOLTE function detection module detects that the VOLTE function is in an enabled state; and
a battery mode acquisition module disposed in the mobile terminal and connected to the VOLTE function detection module, the battery mode acquisition module being configured to cause the processor to acquire an operating mode of a battery of the mobile terminal every second predetermined period when the VOLTE function detection module detects that the VOLTE function is in the enabled state;
wherein when the signal strength acquired by the signal strength acquisition module is smaller than a second strength threshold or when the operating mode of the battery acquired by the battery mode acquisition module is a power saving mode, the control module disable the VOLTE function.

2. The mobile terminal as claimed in claim 1, wherein the program instruction further comprises:
a battery power acquisition module disposed in the mobile terminal and connected to the battery mode acquisition module, the battery power acquisition module being configured to cause the processor to acquire a power value of the battery when the operating mode of the battery acquired by the battery mode acquisition module is a normal mode;
wherein when the power value of the battery acquired by the battery power acquisition module is less than a predetermined power value, the control module disable the VOLTE function.

3. The mobile terminal as claimed in claim 1, wherein the program instruction further comprises:
a data traffic acquisition module disposed in the mobile terminal and connected to the VOLTE function detection module, the data traffic acquisition module being configured to cause the processor to acquire the data traffic of the mobile terminal within a second predetermined time interval every third predetermined period when the VOLTE function detection module detects that the VOLTE function is in the enabled state;
wherein when the data traffic acquired by the data traffic acquisition module is greater than or equal to a second predetermined traffic value, the control module disable the VOLTE function.

4. A method for controlling a VOLTE function based on a mobile terminal comprising:
detecting a working state of the VOLTE function;
acquiring a signal strength of an LTE network where the mobile terminal is located if the VOLTE function is in a disabled state;
continuing to acquire data traffic of the mobile terminal within a first predetermined time interval if the signal strength is greater than or equal to a first strength threshold;
enabling the VOLTE function if the data traffic is smaller than a first predetermined traffic value;
acquiring an operating mode of a battery of the mobile terminal every second predetermined period if the VOLTE function is in an enabled state; and
disabling the VOLTE function if the operating mode of the battery is a power saving mode.

5. The method as claimed in claim 4, further comprising:
acquiring the signal strength of the LTE network where the mobile terminal is located every first predetermined period if the VOLTE function is in an enabled state; and
disabling the VOLTE function if the signal strength is smaller than a second strength threshold.

6. The method as claimed in claim 4, further comprising:
acquiring a power value of the battery if the operating mode of the battery is a normal mode; and
disabling the VOLTE function if the power value of the battery is less than a predetermined power value.

7. The method as claimed in claim 4, further comprising:
acquiring the data traffic of the mobile terminal within a second predetermined time interval every third predetermined period if the VOLTE function is in an enabled state; and
disabling the VOLTE function if the data traffic is greater than or equal to a second predetermined traffic value.

8. A mobile terminal comprising a processor and a memory coupled to the processor;
the memory being configured to store a program instruction;
the processor being configured to execute the program instruction to perform operations of:
detecting a working state of the VOLTE function;
acquiring a signal strength of an LTE network where the mobile terminal is located if the VOLTE function is in a disabled state;

continuing to acquire data traffic of the mobile terminal within a first predetermined time interval if the signal strength is greater than or equal to a first strength threshold;

enabling the VOLTE function if the data traffic is smaller than a first predetermined traffic value;

acquiring an operating mode of a battery of the mobile terminal every second predetermined period if the VOLTE function is in an enabled state; and disabling the VOLTE function if the operating mode of the battery is a power saving mode.

9. The mobile terminal as claimed in claim 8, wherein the processor is further configured to execute the program instruction to perform operations of:

acquiring the signal strength of the LTE network where the mobile terminal is located every first predetermined period if the VOLTE function is in an enabled state; and disabling the VOLTE function if the signal strength is smaller than a second strength threshold.

10. The mobile terminal as claimed in claim 8, wherein the processor is further configured to execute the program instruction to perform operations of:

acquiring a power value of the battery if the operating mode of the battery is a normal mode; and disabling the VOLTE function if the power value of the battery is less than a predetermined power value.

11. The mobile terminal as claimed in claim 8, wherein the processor is further configured to execute the program instruction to perform operations of:

acquiring the data traffic of the mobile terminal within a second predetermined time interval every third predetermined period if the VOLTE function is in an enabled state; and disabling the VOLTE function if the data traffic is greater than or equal to a second predetermined traffic value.

* * * * *